United States Patent
Kosaka et al.

(10) Patent No.: US 8,531,726 B2
(45) Date of Patent: Sep. 10, 2013

(54) IMAGE READ PROCESSING DEVICE AND IMAGE READ PROCESSING METHOD

(75) Inventors: Kiyoto Kosaka, Ishikawa (JP); Naoyoshi Kiku, Ishikawa (JP)

(73) Assignee: PFU Limited, Ishikawa (JP)

( * ) Notice: Subject to any disclaimer, the term of this patent is extended or adjusted under 35 U.S.C. 154(b) by 1517 days.

(21) Appl. No.: 11/770,302

(22) Filed: Jun. 28, 2007

(65) Prior Publication Data

US 2008/0117479 A1 May 22, 2008

(30) Foreign Application Priority Data

Nov. 20, 2006 (JP) ................................ 2006-313000

(51) Int. Cl.
G06F 15/00 (2006.01)
G06F 3/12 (2006.01)
G06K 1/00 (2006.01)
G06K 15/02 (2006.01)
G06K 15/00 (2006.01)

(52) U.S. Cl.
USPC ........... 358/2.1; 358/1.6; 358/1.11; 358/1.12; 358/1.13; 358/1.15; 358/1.18

(58) Field of Classification Search
USPC ............... 358/1.15, 1.13, 403, 474, 3.23, 1.6, 358/2.1, 1.11, 1.12, 1.18
See application file for complete search history.

(56) References Cited

U.S. PATENT DOCUMENTS

| | | | | |
|---|---|---|---|---|
| 5,911,044 A * | 6/1999 | Lo et al. | ......................... | 709/203 |
| 6,192,165 B1 * | 2/2001 | Irons | ............................. | 382/306 |
| 6,480,304 B1 * | 11/2002 | Os et al. | ......................... | 358/474 |
| 6,542,635 B1 * | 4/2003 | Hu et al. | ........................ | 382/173 |
| 6,694,065 B2 * | 2/2004 | Kobara et al. | ................. | 382/305 |
| 6,704,120 B1 * | 3/2004 | Leone, III et al. | ........... | 358/1.18 |
| 6,782,144 B2 * | 8/2004 | Bellavita et al. | .............. | 382/310 |
| 6,801,340 B1 * | 10/2004 | Endo | ............................. | 358/403 |
| 6,839,149 B2 * | 1/2005 | Herr | ............................. | 358/1.15 |
| 7,016,536 B1 * | 3/2006 | Ling et al. | ..................... | 382/190 |

(Continued)

FOREIGN PATENT DOCUMENTS

| | | |
|---|---|---|
| CN | 1496078 A | 5/2004 |
| JP | 01-305479 | 12/1989 |
| JP | 10275209 | 10/1998 |
| JP | 11175696 | 7/1999 |

OTHER PUBLICATIONS

CN Office Action dated Aug. 21, 2009.

(Continued)

*Primary Examiner* — Twyler Haskins
*Assistant Examiner* — Jonathan Beckley
(74) *Attorney, Agent, or Firm* — Lowe, Hauptman & Ham, LLP

(57) ABSTRACT

An image read processing device connected to a scanner reading an image of a document comprises at least a memory and a controller. The memory comprises a setting information recording unit that records a setting information with an application to start up depending on a document size defined there. The controller comprises a scanner controlling unit that controls the scanner, a document size checking unit that checks the document size of the image read out by the scanner according to the control of the scanner controlling unit, and a start-up application determining unit that determines the application depending on the document size checked by the document size checking unit, based on the setting information recorded in the setting information recording unit and starts up the application.

9 Claims, 8 Drawing Sheets

(56) References Cited

U.S. PATENT DOCUMENTS

| | | | |
|---|---|---|---|
| 7,069,240 B2* | 6/2006 | Spero et al. | 705/30 |
| 7,383,328 B2* | 6/2008 | Iyoki | 709/222 |
| 7,388,682 B1* | 6/2008 | Ihara | 358/1.15 |
| 7,505,162 B2* | 3/2009 | Tan | 358/1.15 |
| 7,545,535 B2* | 6/2009 | Zhen | 358/1.9 |
| 7,620,892 B2* | 11/2009 | Rainero et al. | 715/273 |
| 7,652,781 B2* | 1/2010 | Fukui et al. | 358/1.15 |
| 7,672,003 B2* | 3/2010 | Dowling et al. | 358/1.15 |
| 7,688,480 B2* | 3/2010 | Kuo | 358/486 |
| 7,724,400 B2* | 5/2010 | Cousins et al. | 358/474 |
| 7,734,715 B2* | 6/2010 | Hyakutake et al. | 709/217 |
| 7,746,492 B2* | 6/2010 | Ishihara et al. | 358/1.15 |
| 7,852,518 B2* | 12/2010 | Nakazawa | 358/444 |
| 8,213,687 B2* | 7/2012 | Fan | 382/112 |
| 2001/0021270 A1* | 9/2001 | Kobara et al. | 382/181 |
| 2002/0048413 A1* | 4/2002 | Kusunoki | 382/282 |
| 2004/0223168 A1* | 11/2004 | Haneda et al. | 358/1.1 |
| 2005/0010868 A1* | 1/2005 | Schowtka et al. | 715/517 |
| 2005/0024683 A1* | 2/2005 | Liu | 358/1.18 |
| 2005/0134901 A1* | 6/2005 | Herr | 358/1.15 |
| 2005/0242168 A1* | 11/2005 | Tesavis et al. | 235/375 |
| 2006/0158700 A1* | 7/2006 | Byun et al. | 358/474 |
| 2006/0176524 A1* | 8/2006 | Willrich | 358/474 |
| 2008/0062458 A1* | 3/2008 | Inui | 358/1.15 |

OTHER PUBLICATIONS

Japanese Office Action for Application No. 2006-313000 mailed Apr. 12, 2011.

* cited by examiner

1: DOCUMENT
2: BACKING PORTION
3: REFERENCE DATA
   GENERATING REGION

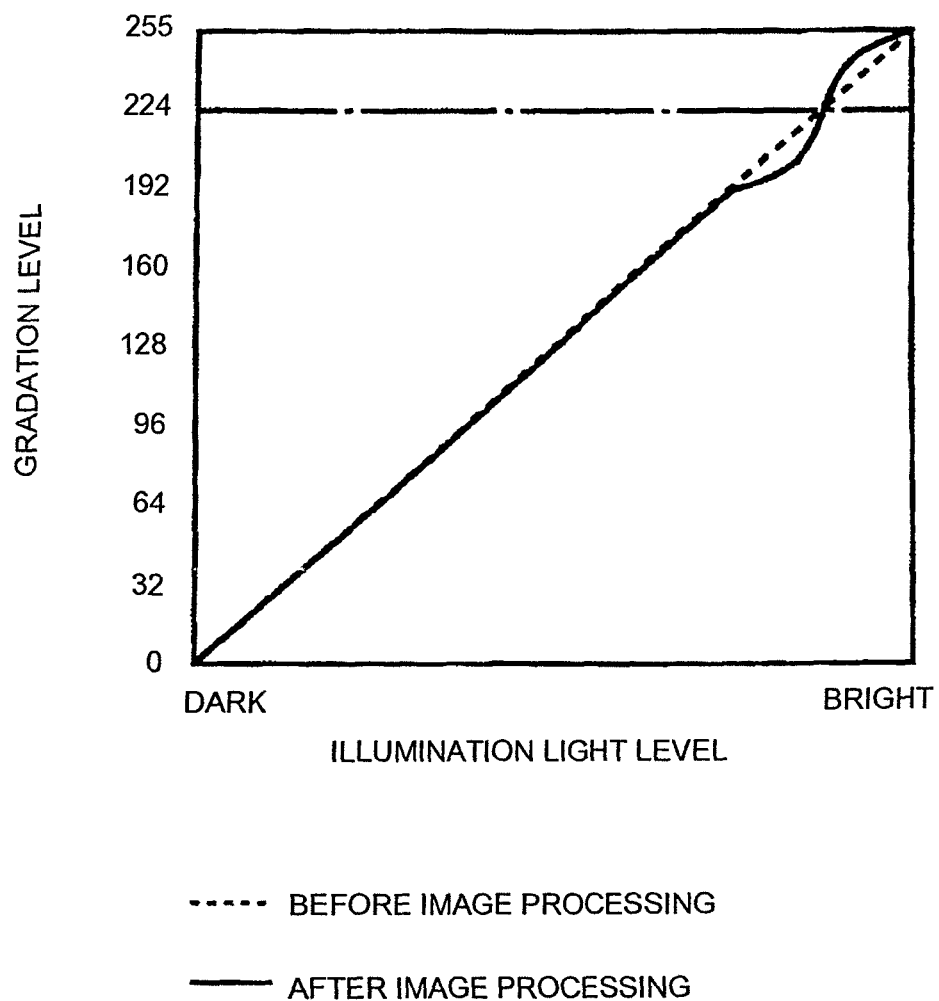

IMAGE READ PROCESSING DEVICE AND IMAGE READ PROCESSING METHOD

RELATED APPLICATIONS

The present application is based on, and claims priority from, Japan Application Number 2006-313000, filed Nov. 20, 2006, the disclosure of which is hereby incorporated by reference herein in its entirety.

BACKGROUND OF THE INVENTION

1. Field of the Invention

The invention relates to an image read processing device and an image read processing method, and more particularly to an image read processing device and an image read processing method of automatically switching applications.

2. Description of the Related Art

Conventionally, when a scanner is used to read an image, a user selects and starts up an application after the scanner reads the image, or a computer starts up the application which a user previously selected. In another method, a user reads out the image in an activated application by controlling the scanner.

According to a method disclosed in Japanese Patent Application Laid-Open JP-A-1-305479, setting information such as a read-out region and resolution is recorded for every document size, and a user selects a document size when reading an image, hence to transfer the corresponding the setting information to an image input device.

In the prior method, however, when it is necessary to switch the applications, a user has to select and start up an application to read out an image, or a user has to specify an application he or she wants to use on a scanner driver. In the case of using a plurality of applications, there is a problem that the operation is complicated.

Especially, according to the method disclosed in Japanese Patent Application Laid-Open JP-A-1-305479, a user has to take the trouble to select a document size and a user has to specify an application after reading an image through a scanner because it is not configured to automatically activate an application.

SUMMARY OF THE INVENTION

It is an object of the present invention to at least partially solve the problems in the conventional technology.

With the above taken into consideration, an object of the invention is to provide an image read processing device and an image read processing method capable of switching applications easily without a troublesome operation.

The image read processing device according to one aspect of the present invention is connected to a scanner reading an image of a document and includes at least a memory and a controller, wherein the memory includes a setting information recording unit that records setting information with an application to start up depending on a document size defined there, and the controller includes a scanner controlling unit that controls the scanner, a document size checking unit that checks the document size of the image read out by the scanner according to the control of the scanner controlling unit, and a start-up application determining unit that determines the application depending on the document size checked by the document size checking unit, based on the setting information recorded in the setting information recording unit and starts up the application.

The image read processing method according to another aspect of the present invention is performed by the image read processing device connected to a scanner reading out an image of a document and including at least a memory and a controller, wherein the memory includes a setting information recording unit that records the setting information with an application to start up depending on a document size defined there, the method includes a scanner controlling step of controlling the scanner, a document size checking step of checking the document size of the image read out according to the control of the scanner at the scanner controlling step, and a start-up application determining step of determining the application depending on the document size checked at the document size checking step, based on the setting information recorded in the setting information recording unit and starting up the application, which steps are performed by the controller.

According to the invention, an application does not need to be switched by a user manually and it is automatically switched to start up depending on the document size which has been read, thereby improving the convenience. Further, it is possible to avoid an operational mistake caused by a user's manually switching.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 8 is a view for explaining the control of the image processing by a document size checking unit 102*b*.

DETAILED DESCRIPTION OF THE PREFERRED EMBODIMENTS

Hereinafter, embodiments of an image read processing device and an image read processing method according to the invention will be described in detail based on the drawings. The invention is not limited to the embodiments.

[Outline of the Invention]

Hereinafter, the outline of the invention will be described, and then, the structure, processing and the like of the invention will be described in detail.

The invention includes the following basic characteristics schematically. That is, the invention is formed by connecting to a scanner which reads an image of a document.

The invention records the setting information with each application to start up depending on a document size defined there. The invention may record the setting information with a definition about the applications to start up depending on the design information including character, figure, symbol, color, layout, or the like. The contents of the specific setting information and the processing method based on the setting information will be described later more specifically.

The invention controls a scanner to read out a document image.

Next, the invention checks a document size of the read image. It may check the document size by detecting an edge portion of the read document.

Finally, it determines an application depending on the checked document size based on the recorded setting information, and starts up the application. It may recognize the layout of the read image and determine the application depending on the recognized design information based on the recorded setting information and start up the application.

The invention may be formed in such a way that after starting up a corresponding application, the image information or the recognized design information may be transferred to the application, or that an application may be started up according to the recognized design information.

The above is the outline of the invention. According to the invention, since an application automatically starts up corresponding to the read document size, a user does not have to take the trouble to select and start up the application manually, hence to improve the convenience and avoid a human operational error.

[Structure of the Image Read Processing Device]

Figure 1:
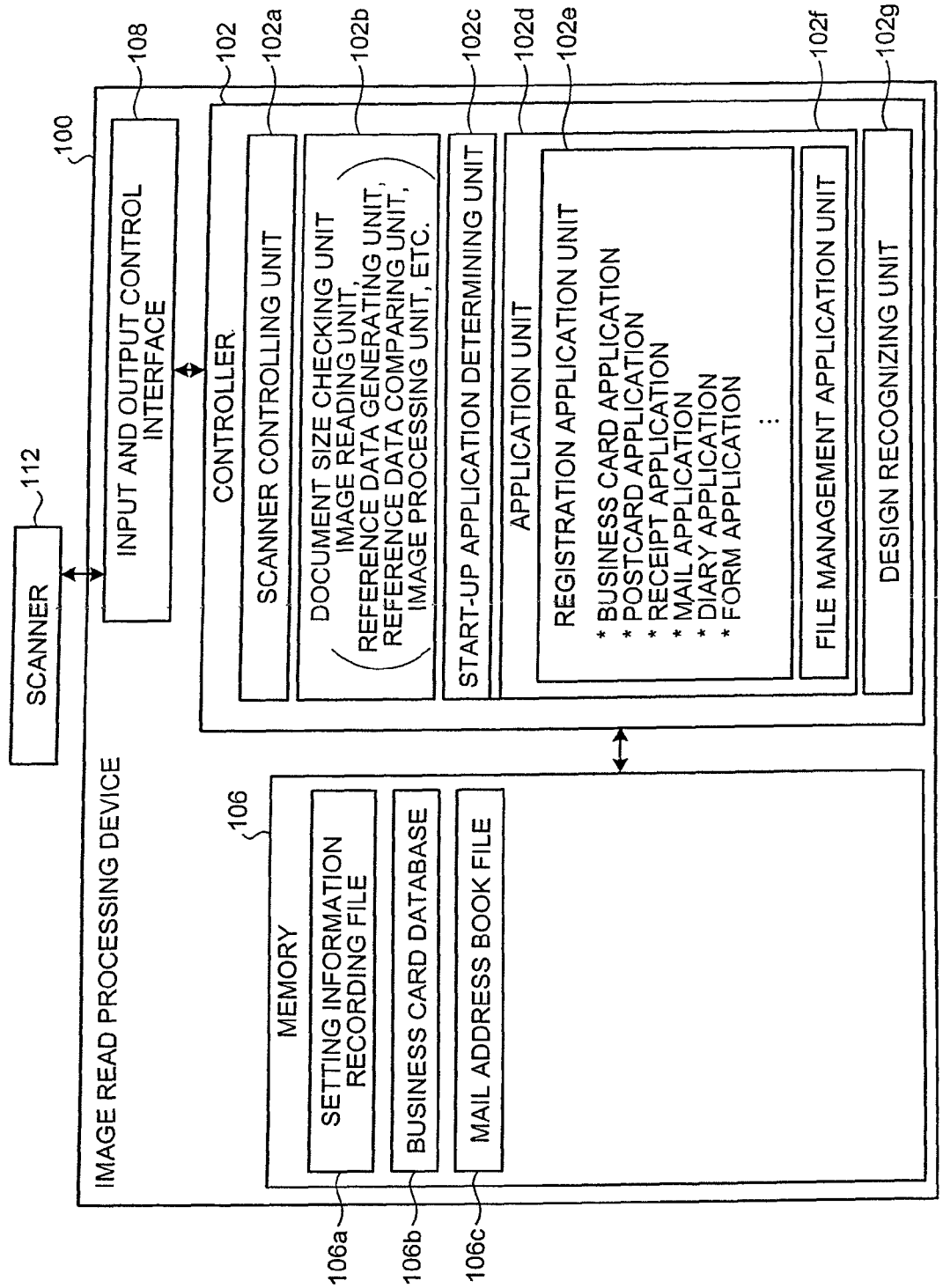
FIG. 1 is a block diagram showing an example of the structure of an image read processing device according to the invention.

First, the structure of the image read processing device will be described. FIG. 1 is a block diagram showing an example of the structure of the image read processing device according to the invention and conceptually depicts only a portion relating to the invention of the whole structure. As shown in FIG. 1, the image read processing device 100 is connected to a scanner 112 in a manner capable of communication with each other.

In FIG. 1, the image read processing device 100 schematically includes a controller 102 such as a CPU which controls the whole image read processing device 100, an input and output control interface unit 108 which is connected to the scanner 112, and a memory 106 which stores various databases and tables. These units are connected to each other through some communication channel in a manner capable of communication with each other.

Various databases and tables stored in the memory 106 (a setting information recording file 106a to a mail address book file 106c) are storage means of a fixed disk or the like, for storing various programs, tables, files, databases, and the like used for various processing.

Of the components of the memory 106, the setting information recording file 106a is setting information recording means for recording the setting information including a definition about each application to start up depending on the information of the document size or the design information.

The "setting information" is the information in which each application to start up is defined corresponding to the information of document size or design information. It may be defined as follows: when the document size is business card size, a business card application or a mail application starts up; when the document size is postcard size, a postcard application starts up; when the document size is receipt size, a receipt application starts up; when the document size is photo size, a diary application starts up; when the document has the other registered size or layout, an application for the registered size or the layout starts up; and when it has none of the registered size and layout, a file management application starts up. Here, the setting information may be defined as follows:

1) when at least one of the images of a plurality of documents has the business card size, 2) when the design information recognized by design recognizing unit 102g from the image of the business card size has been read out before, 3) when the design information recognized by the design recognizing unit 102g from the image of the business card size includes a mail address, or 4) when the figure, the symbol, or the color recognized by the design recognizing unit 102g from the image of the business card size is a previously specified one, the mail application starts up as the application and the information is transferred to the started mail application with the mail address in the recognized design information as a destination and the other image information or design information of the document as an attached file.

Of the components of the memory 106, a business card database 106b is business card storing means for storing the read business card information.

The mail address book file 106c is mail address recording means for recording a list of mail addresses.

In FIG. 1, the input and output control interface unit 108 controls the scanner 112.

The scanner 112 is document image reading means for reading a document image.

In FIG. 1, the controller 102 includes an internal memory for storing a control program such as an OS (Operating System), a program of defining various processing procedures, and necessary data. It performs information processing in order to execute various operations according to these programs. The controller 102 conceptually includes a scanner controlling unit 102a, a document size checking unit 102b, a start-up application determining unit 102c, an application unit 102d, and a design recognizing unit 102g.

The scanner controlling unit 102a is scanner control means for controlling the scanner 112 through the input and output control interface unit 108.

The document size checking unit 102b is document size checking means for checking the document size of the image read out by the scanner 112 according to the control of the scanner controlling unit 102a. The document size checking unit 102b may check the document size by detecting the edge portion of the document in the read out image.

The start-up application determining unit 102c is start-up application determining means for determining and starting up an application corresponding to any one of the document size checked by the document size checking unit 102b and the design information recognized by the design recognizing unit 102g or both, based on the setting information recorded in the setting information recording file 106a. The start-up application determining unit 102c may start up the application based on the setting information recorded by the setting information recording file 106a and transfer the image information or the design information recognized by the design recognizing unit 102g to the application unit 102d. When a user opens the read image through his or her specified application, the start-up application determining unit 102c may store the application into the setting information recording file 106a with the same application defined by the corresponding any one of the document size checked by the document size checking unit 102b and the corresponding design information recognized by the design recognizing unit 102g or both.

The application unit 102d is application means for realizing a specific function. As shown in FIG. 1, the application unit 102d includes a registration application unit 102e and a file management application unit 102f. The registration application unit 102e is application means for the registered size and layout, which is started up when the document size checked by the document size checking unit 102b is any one of the size and the layout or both which is registered in the setting information of the setting information recording file 106a. As an example of the registration application unit 102e to start up, there are a business card application, a postcard application, a receipt application, a mail application, a diary application, a form application.

The file management application unit 102f is file management application means, which is activated when the document size checked by the document size checking unit 102b is none of the registered size and layout in the setting information recorded in the setting information recording file 106a. The file management application unit 102f may have a function for transferring the data of the obtained image information, design information or the like. The registration application unit 102e may control input and output control interface 108 so that a user may specify an application to start up corresponding to any one of the document size checked by the document size checking unit 102b and the layout recognized by the design recognizing unit 102g or both, and control memory 106 so that the specified application may be stored in the setting information recording file 106a with it defined by the corresponding any one of document size and layout or both. The structure of the image read processing device is as mentioned above.

Figure 2:
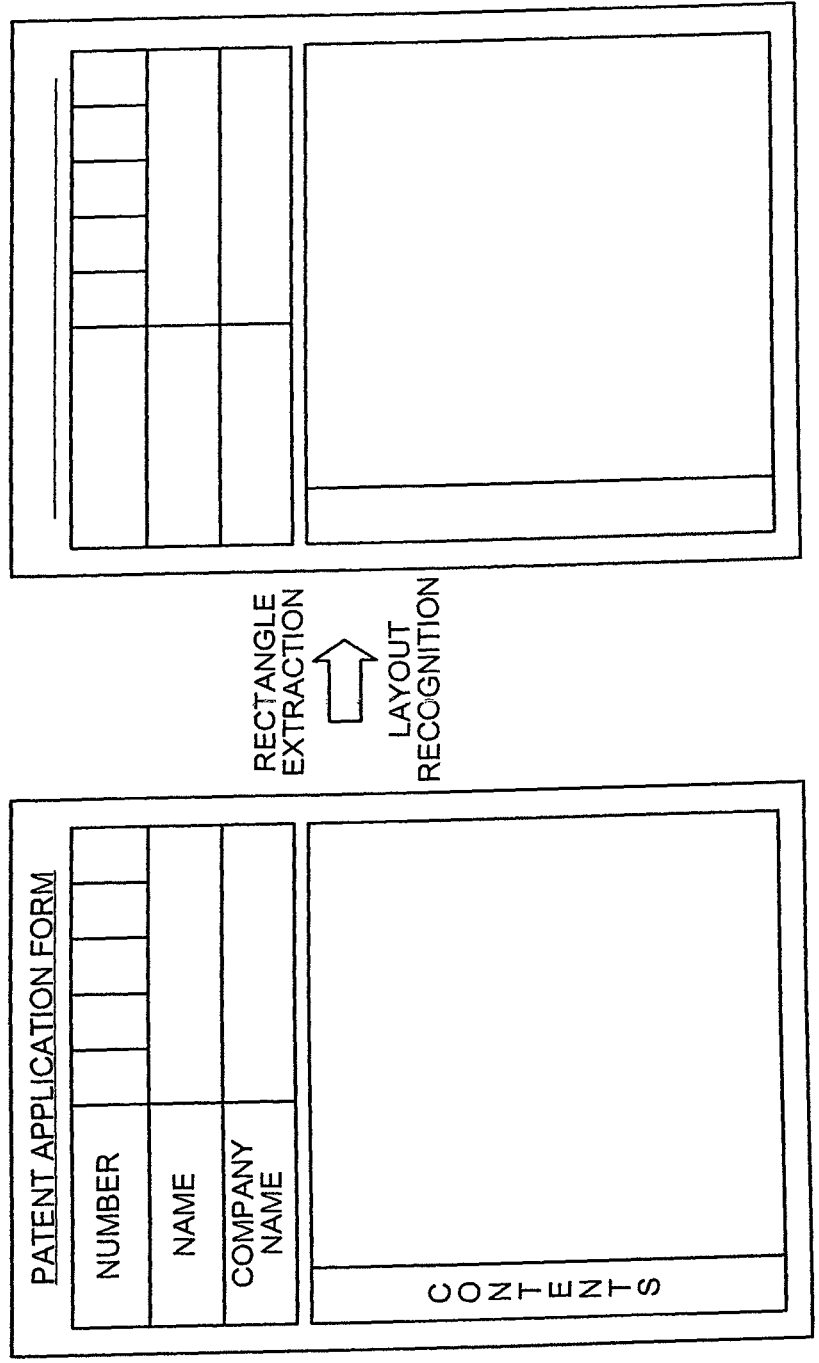
FIG. 2 is a view showing an example of the layout recognized by a design recognizing unit 102*g*.

The design recognizing unit 102g is design information recognizing means for recognizing character, figure, symbol, color, layout or the like as the design information from the image. For example, the design recognizing unit 102g may obtain the layout information, the figure information, and the like, and it may also obtain a character and a symbol by using optical character recognition (OCR) means. FIG. 2 depicts an example of the layout recognized by the design recognizing unit 102g.

When the scanner 112 reads out the image of the document like the left view of FIG. 2, the design recognizing unit 102g recognizes the layout as shown in the right view of FIG. 2 through recognition of rectangle information. The "rectangle information" includes, for example, the information about the width and the length of a rectangle, the number of rectangles, the position of a rectangle, the length of straight line, and the like. The layout information obtained from the rectangle information is used for, for example, forms control.

The structure of the image read processing device is as mentioned above.

[Image Reading Processing]

Next, an example of the processing of the image read processing device 100 thus constituted according to the embodiment will be specifically described below referring to FIG. 1 and FIG. 3 to FIG. 6.

[Start-Up Application Determining Processing]

Figure 3:
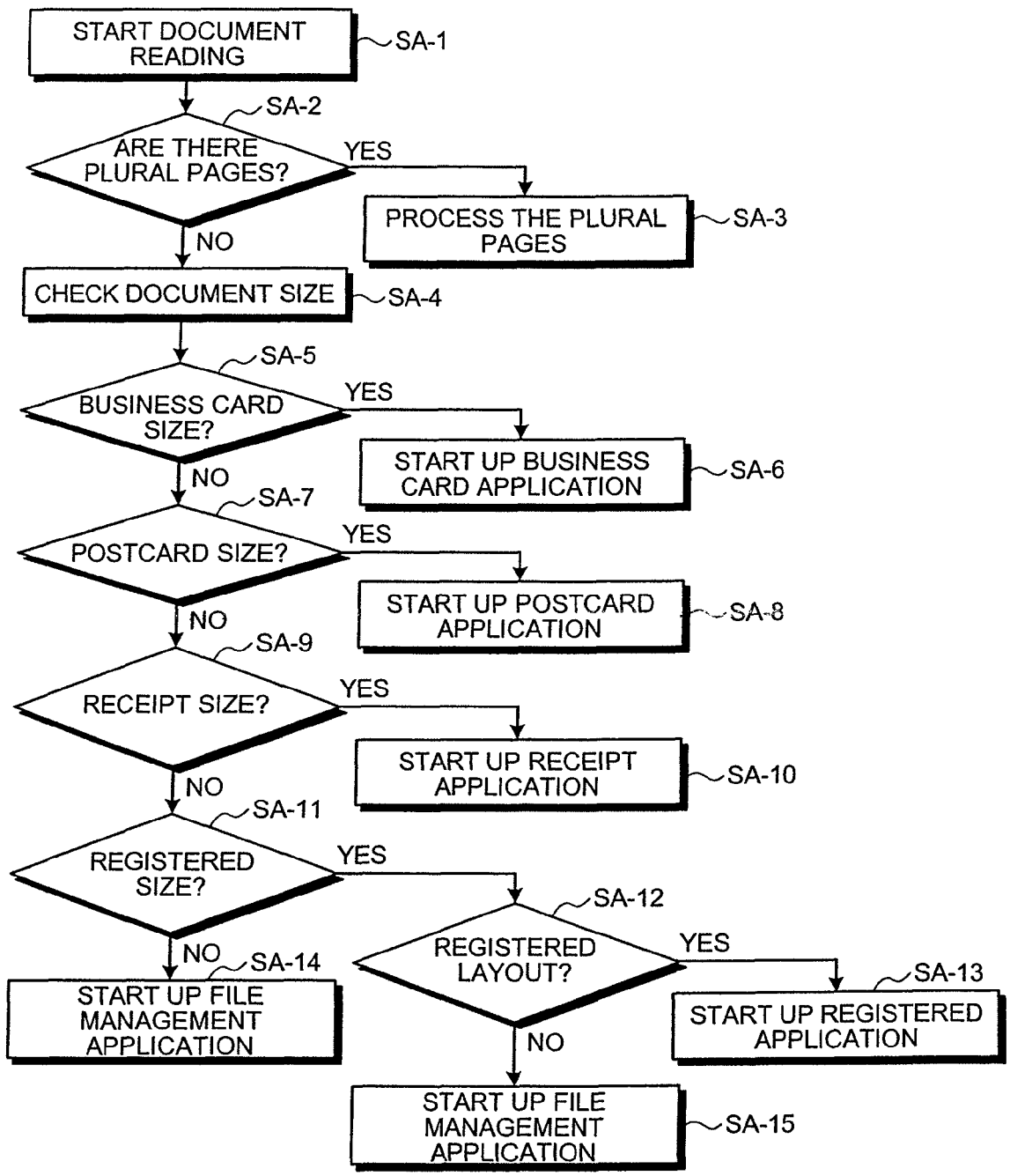
FIG. 3 is a flow chart showing an example of scanner control processing, document size checking processing, and start-up application determining processing of the image read processing device 100 according to the embodiment.

First, the detail of the start-up application determining processing will be described referring to FIG. 3. FIG. 3 is a flow chart showing an example of scanner control processing, document size checking processing, and application determining processing according to the image read processing device 100 of the embodiment.

As shown in FIG. 3, upon receipt of a reading start instruction from a user operating the input device or the like, the scanner controlling unit 102a starts the image reading of the document while controlling the scanner 112 through the input and output control interface unit 108 (Step SA-1).

The scanner controlling unit 102a checks whether the document has a plurality of pages or not (Step SA-2). When the document has a plurality of pages (Step SA-2, Yes), it starts the pages processing (Step SA-3). The contents of the plural pages processing will be described below referring to FIG. 4.

On the other hand, when the scanner controlling unit 102a determines that the document has only one page (Step SA-2, No), the document size checking unit 102b checks the document size of the image which has been read out by the scanner 112 according to the control of the scanner controlling unit 102a (Step SA-4). In checking the document size, the document size checking unit 102b may check the size by detecting the edge portion of the document of the read out image.

The start-up application determining unit 102c determines an application corresponding to the document size checked through the processing of the document size checking unit 102b, based on the setting information recorded in the setting information recording file 106a, to start up the application. That is, when the document size checked through the processing of the document size checking unit 102b is the business card size (Step SA-5, Yes), the start-up application determining unit 102c starts up the business card application based on the setting information recorded in the setting information recording file 106a (Step SA-6).

On the other hand, when the document size is not the business card size (Step SA-5, No), the start-up application determining unit 102c determines whether the above document size is the postcard size or not. When the size is the postcard size (Step SA-7, Yes), it starts up the postcard application (Step SA-8).

When the document size is not the postcard size (Step SA-7, No), the start-up application determining unit 102c determines whether the above document size is the receipt size or not. When the size is the receipt size (Step SA-9, Yes), it starts up the receipt application (Step SA-10).

When the document size is not the receipt size (Step SA-9, No), the start-up application determining unit 102c determines whether the above document size is the other registered size or not. When it is the other registered size (Step SA-11, Yes), the start-up application determining unit 102c further determines whether the layout recognized by the design recognizing unit 102g is the registered layout or not (Step SA-12).

When the layout is the registered one (Step SA-12, Yes), the start-up application determining unit 102c starts up the corresponding registered application (Step SA-13).

When it is not the registered one (Step SA-12, No), the start-up application determining unit 102c starts up the file management application (Step SA-15).

The processing is returned to the description of Step SA-11, where the start-up application determining unit 102c determines that the document size is not the registered one (Step SA-11, No), and starts up the file management application (Step SA-14). The detailed processing of the file management application unit 102f which is started up by the start-up application determining unit 102c will be described below referring to FIG. 6.

[Plural Pages Processing]

Figure 4:
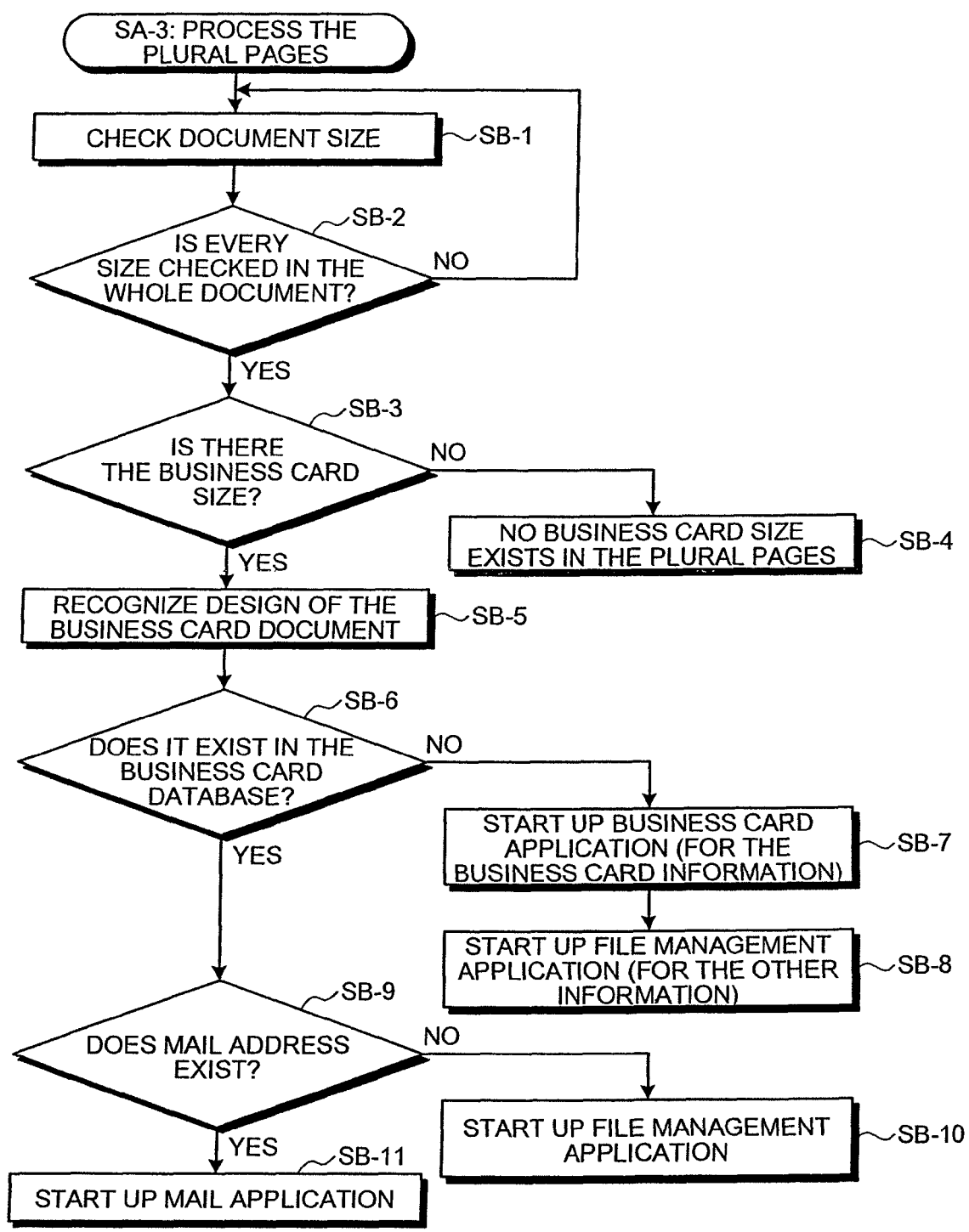
FIG. 4 is a flow chart showing an example of plural pages processing.

As mentioned above, when the scanner controlling unit 102a determines that the document has a plurality of pages, the plural pages processing is performed (Step SA-3). Here, the detail of the plural pages processing is described referring to FIG. 4. FIG. 4 is a flow chart showing an example of the plural pages processing.

As shown in FIG. 4, the document size checking unit 102b checks the document size of the image read out by the scanner 112 according to the control of the scanner controlling unit 102a (Step SB-1).

The document size checking unit 102b checks whether every size of all the document images is checked or not (Step SB-2), according to the number of pages which has been read out by the scanner controlling unit 102a. When the document size checking unit 102b checks that there still remains an image whose size is not checked yet (Step SB-2, No), the processing is returned to Step SB-1 and the processing of Step SB-1 and Step SB-2 is repeated until the document size checking processing is completed as for all the document images.

On the other hand, when the document size checking unit 102b checks that every size of all the document images is checked (Step SB-2, Yes), the start-up application determining unit 102c determines an application corresponding to the document size checked by the document size checking unit 102b, based on the setting information recorded in the setting information recording file 106a, to start up the application. Specifically, the start-up application determining unit 102c determines whether there is that one whose size is the business card size in the plural document images checked by the document size checking unit 102b (Step SB-3).

When the start-up application determining unit 102c determines that there is no document whose size is the business card size in all the documents (Step SB-3, No), it performs the processing for the case of no business card size existing in the pages (Step SB-4). The details of the above processing will be described below referring to FIG. 5.

When the start-up application determining unit 102c determines that at least one of the document images is of the business card size (Step SB-3, Yes), the design recognizing unit 102g recognizes the layout or the like based on the image of the business card size (Step SB-5). Here, the design recognizing unit 102g may use the OCR processing for the design recognizing processing.

The start-up application determining unit 102c retrieves the business card information (company name, name etc.) of the design information recognized by the design recognizing unit 102g from the business card database 106b (Step SB-6).

When the start-up application determining unit 102c determines that the business card database 106b does not have the recognized business card information (Step SB-6, No), it determines that the business card information is new, starts up the business card application (registration application unit 102e) in order to register the business card information (Step SB-7), and starts up the file management application unit 102f in order to process (for example, store) the image information or the design information of the other documents (Step SB-8).

When the start-up application determining unit 102c determines that the business card database 106b has the business card information (Step SB-6, Yes), it also determines whether the recognized design information includes a mail address or not (Step SB-9). The start-up application determining unit 102c may determine the above according to whether there is, for example, an at-mark "@" or not.

When the start-up application determining unit 102c determines that there is no mail address (Step SB-9, No), it starts up the file management application unit 102f (Step SB-10).

When the start-up application determining unit 102c determines that there is a mail address (Step SB-9, Yes), it starts up the mail application (registration application unit 102e). The mail application unit (registration application unit 102e) sets the design information which is determined to be the mail address as a destination address and the image information or the design information of the other documents as an attached file or a text body and displays a mail screen. The mail application unit (registration application unit 102e) may be configured to store the mail address in the mail address book file 106c.

The start-up application determining unit 102c may be configured to determine whether it starts up the mail application or not by determining whether a specific mark (such as characters, figures, symbols, colors, and for example, a X mark written in a red ink) exists in the image of the business card size.

The above is the flow of the plural pages processing (when there is the business card). Accordingly, a user can start up the mail application automatically by scanning the document of the mail body and the photo document together with the business card and a mail screen with the mail address, the attached file or the like set automatically is displayed, thereby improving the convenience.

[Processing for No Business Card Size in Plural Pages]

Figure 5:
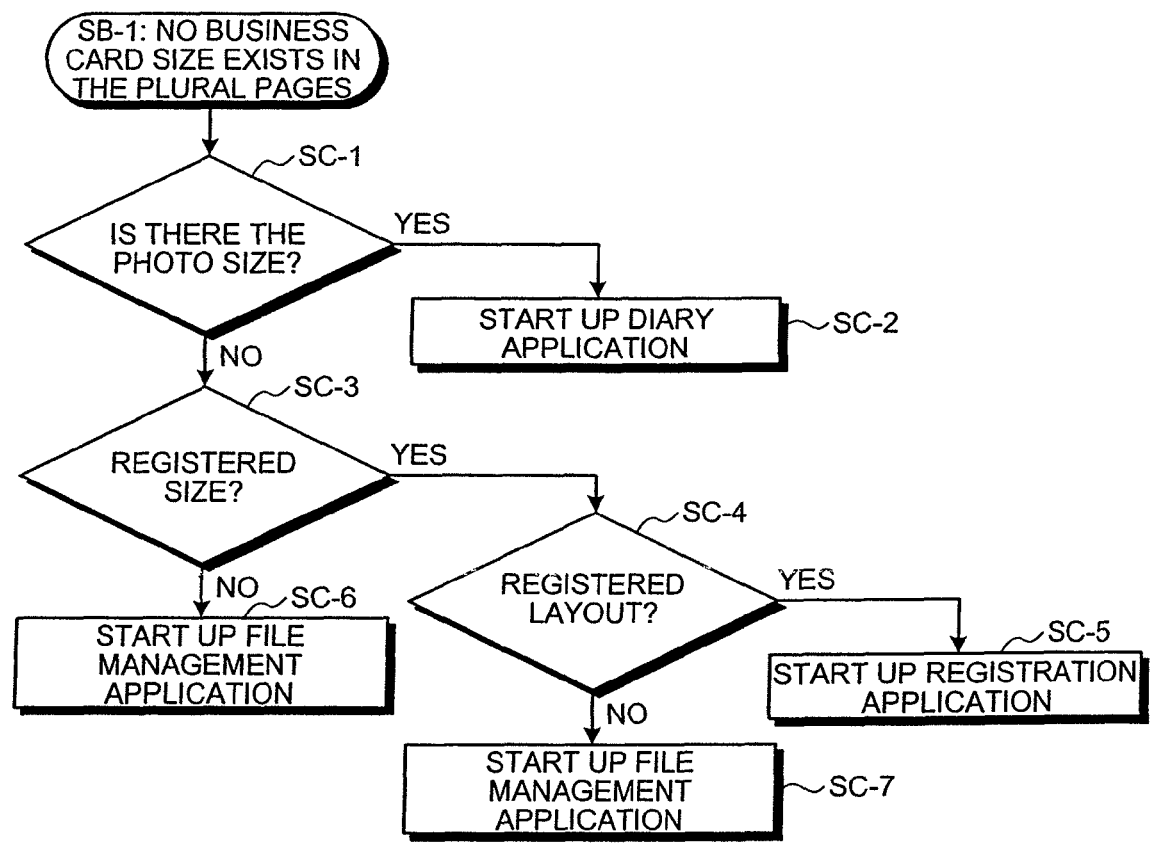
FIG. 5 is a flow chart showing an example of the processing when there is no business card size in a plurality of pages, according to the image read processing device of the embodiment.

The detail of the processing for the case of no business card size existing in the plural pages (Step SB-4) will be described referring to FIG. 5. FIG. 5 is a flow chart showing an example of the processing when there is no business card size in the plural pages, according to the image read processing device of the embodiment.

As shown in FIG. 5, at first, the start-up application determining unit 102c determines whether the plurality of document images checked by the document size checking unit 102b includes a document of the photo size (for example, L-size) (Step SC-1).

When the start-up application determining unit 102c determines that there is the image document of the photo size (Step SC-1, Yes), it starts up the diary application. The started diary application unit (registration application unit 102e) stores the image information or the design information of the other document together with the image information of the photo size as the diary and displays the image information of the photo size on the screen (SC-2).

When the start-up application determining unit 102c determines that there is no document image of the photo size (Step SC-1, No), it determines whether the document size checked by the document size checking unit 102b is the other registered size or not (Step SC-3). When it is the registered size (Step SC-3, Yes), the start-up application determining unit 102c further determines whether the layout recognized by the design recognizing unit 102g is the registered one or not (Step SC-4).

When the start-up application determining unit 102c determines that the layout is the registered one (Step SC-4, Yes), it starts up the corresponding registered form application (registration application unit 102e) based on the setting information (Step SC-5). The started form application unit (registration application unit 102e) divides the data into the same sections as the layout previously stored last, and stores the same. It also stores the data other than the form as the attached file.

When the start-up application determining unit 102c determines that the layout is not the registered one (Step SC-4, No), it starts up the file management application (Step SC-7).

The processing is returned to the description of Step SC-3, where when the start-up application determining unit 102c determines that the document size is not the registered one (Step SC-3, No), it starts up the file management application (Step SC-6). The detailed processing of the file management application unit 102f started up by the file management application will be described later referring to FIG. 6. The processing when there is no document image of the business card size in the plural pages has been described as above.

[Processing of File Management Application Unit]

Figure 6:
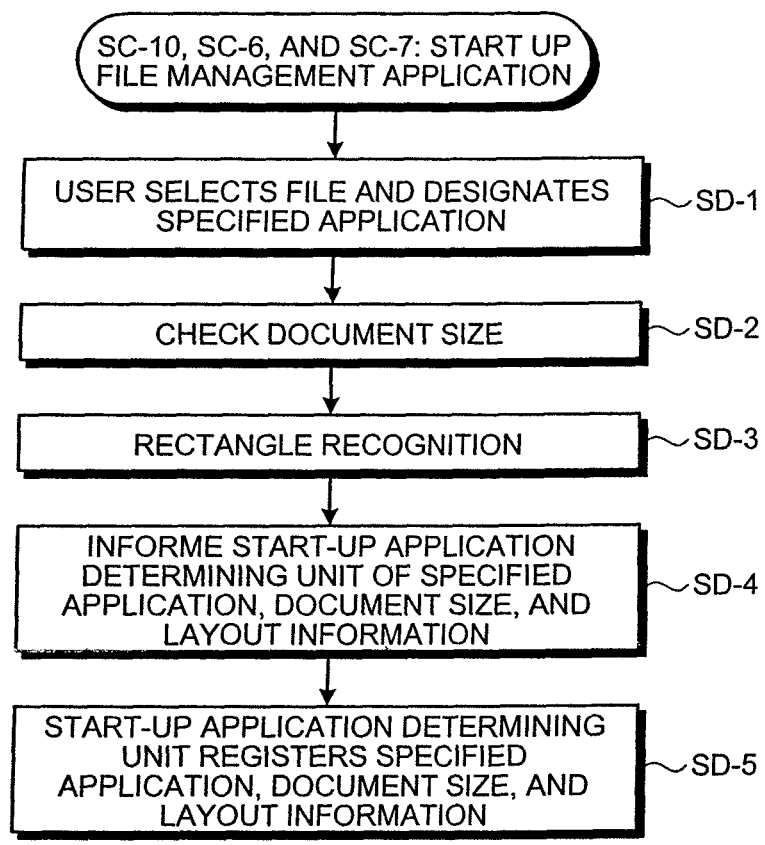
FIG. 6 is a flow chart showing an example of the processing of a file management application unit 102*f* according to the image read processing device of the embodiment.

Next, the detailed processing of the file management application unit 102f will be described referring to FIG. 6. FIG. 6 is a flow chart showing an example of the processing of the file management application unit 102f according to the image read processing device of the embodiment.

First, the file management application unit 102f controls an output device or an input device so as to make a user select a desired application to start up and obtain the information of the specified application selected (Step SD-1).

The file management application unit 102f obtains the document size checked by the document size checking unit 102b (Step SD-2).

The file management application unit 102f controls the design recognizing unit 102g to recognize the rectangle and obtain the layout information (Step SD-3).

The file management application unit 102f informs the start-up application determining unit 102c of the specified application information, the document size information obtained by the document size checking unit 102b, and the layout information obtained by the design recognizing unit 102g as a set correspondingly (Step SD-4).

The informed start-up application determining unit 102c stores this information corresponding to the setting information recording file 106a, hence to additionally register the application to start up depending on any one of the document size and the design information or both in the setting information (Step SD-5).

The file management application unit 102f includes a function of transferring the data of the obtained image information, design information or the like, starts up the specified application, and transfers the data to the registration application unit 102e.

Here, the processing of the file management application unit 102f has been completed. Accordingly, even when the document size or the layout of the read image is not registered in the setting information, it can be set and registered easily and the application automatically starts up at the next scan, thereby improving the convenience.

[Document Size Checking Processing]

Figure 7:
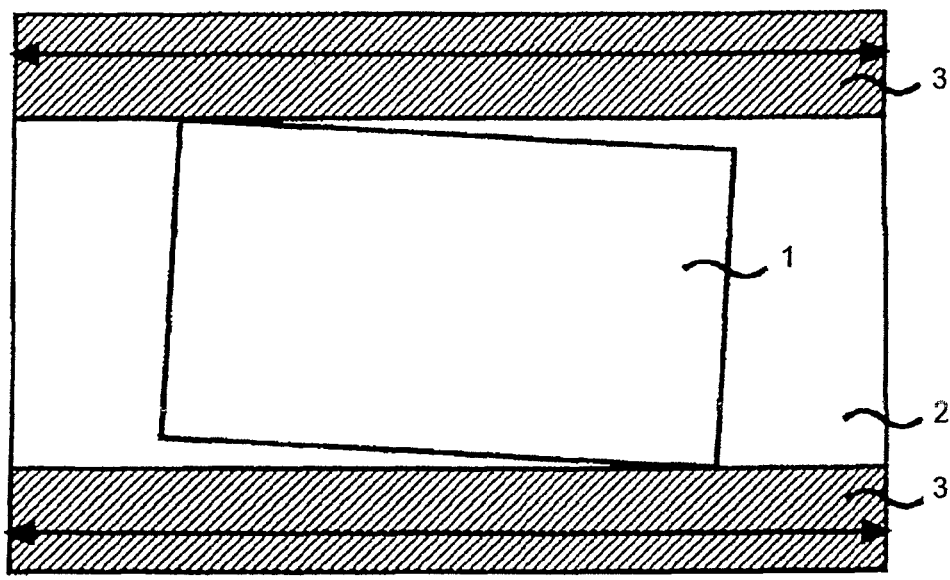
FIG. 7 is a view for explaining the full region corresponding to a backing portion.

An example of the image document size checking processing by detecting the document edge by the image size checking unit 102b will be described in detail referring to FIG. 7 and FIG. 8.

The document size checking unit 102b checks a full region corresponding to a backing portion as for the image read out by the scanner 112. FIG. 7 is a view for explaining the full region corresponding to the backing portion. As shown in FIG. 7, the backing portion 2 is the portion which is arranged on the side opposite to a reading side with the document 1 interposing therebetween when the scanner 112 reads the document and both arrowheads in the view show an example of the full region corresponding to the backing portion 2 arranged in a horizontal direction. That is, the full region corresponding to the backing portion means a mass of the horizontal positions which does not include the document 1.

The document size checking unit 102b may check the region of the backing portion 2 having the full width by exploring the horizontal position at which a gradation level changes, while scanning from the upper end or the lower end of the image for every some pixels.

The document size checking unit 102b sets the region of the backing portion 2 having the full width as a reference data generating region 3 (a shaded portion of the view).

The document size checking unit 102b requires the gradation value of an average gradation or the like in the reference data generating region.

The document size checking unit 102b detects an edge of the document by comparing the generated reference data with the image data and requiring the difference.

The document size checking unit 102b may detect the edge by converting the image using such a tone curve that a sharp change may be obtained near the gradation in the backing portion through the image processing. FIG. 8 is a view for explaining the control of the image processing by the document size checking unit 102b.

As shown in FIG. 8, the document size checking unit 102b sets the tone curve that a sharp change may be obtained near the gradation level (indicated by a dashed line) in the backing portion. This makes clear a difference between the gradation of the document and the gradation of the backing portion and it becomes easy to compare the reference data with the image data, hence to detect the edge of the document easily. The document size checking unit 102b may check the document size by the position of the thus detected edge.

That is, in the image read processing device 100 according to the embodiment, the document size checking unit 102b includes an image reading unit which reads out the image so as to generate the region corresponding to the backing portion having the full width at any one of the upper end and the lower end or both of the document image, a reference data generating unit which generates the reference data for detecting the document edge, using the image data of the region of the backing portion having the full width read out by the image reading unit, and a reference data comparing unit which compares the reference data generated by the reference data generating unit with the image data, and detects the document edge based on the comparison information. The document size checking unit 102b may also include the image processing unit for performing the image processing on a raw image, which may convert the image using a tone curve that a sharp change can be obtained near the gradation in the backing portion and detect the edge.

As mentioned above, the description has been made about the document size checking processing using the document edge detection by the image size checking unit 102b. When the white color is used for the backing of the document in order to set a white reference for white correction and shading correction, even when the background of the document is white and the contrast difference with the backing portion is small, the document image and the document size can be determined accurately.

[Other Embodiments]

Though embodiment of the invention has been described as mentioned above, various embodiments other than the above mentioned embodiment of the invention may be performed within the technical spirit and scope described in the claims.

Especially, in the embodiment, the description has been made in the case where the scanner 112 and the image read processing device 100 are separately formed, however, it is not limited to this and the scanner and the image read processing device may be integrally formed. That is, for example, the image read processing device which is realized by using a micro-chip or the like may be built in the scanner body. Although the description has been made, for example, in the case where the image read processing device 100 performs the processing in a stand-alone way, the processing may be performed in reply to a request from a client terminal which is formed separately from the image read processing device 100 and the processing result may be returned to the client terminal.

Of the respective automatic processing described in the embodiment, all or some may be performed manually. On the contrary, all or some of the manual processing may be performed automatically according to the well-known method.

Further, the processing procedure, the control procedure, the specific names, the information including various registered data of each processing and parameters such as retrieval condition and the database structure shown in the above document and the drawings may be changed optionally unless otherwise specified.

Each component of the image read processing device 100 is just shown conceptually as a function and every component does not have to be always formed physically as shown.

For example, as for the processing functions that the respective units of the image read processing device 100 have, especially, as for the respective processing functions performed by the controller 102, all or some may be realized by the CPU (Central Processing Unit) and a program executed by the CPU, or be realized as hardware according to a wired logic. The program is recorded in a recording medium described below and mechanically read out by the image read processing device 100 depending on the necessity. That is, the memory 106 such as a ROM or a HD gives an instruction to the CPU in cooperation with an OS (Operating System) and records computer programs for various processing. The computer programs are executed loaded in the RAM, hence to form the control unit in cooperation with the CPU.

The computer programs may be recorded in an application program server connected to the image read processing device 100 through some network and all or some of them can be downloaded depending on the necessity.

The program such as an application program according to the invention may be stored in a computer-readable recording medium. The "recording medium" includes any "transportable physical media" such as a flexible disk, a magnetic optical disk, a ROM, an EPROM, an EEPROM, a CD-ROM, and a DVD or a "communication media" which holds the program in a short time, such as a communication line and a carrier when a program is transmitted through the network such as LAN, WAN, and the Internet.

The "program" is a data processing method which is described in some language and some description method and does not care about the form of a source code and a binary code or the like. The "program" is not limited to a single form but includes a dispersed form as a plurality of modules and libraries or a program working in cooperation with the separate program such as the OS (Operating System). The well-known structure and procedure can be used for the specific structure and procedure for reading a program through the recording medium the install procedure in each unit or the like shown in the embodiment.

Each database or the like stored in the memory 106 (the setting information recording file 106a to the mail address book file 106c) is a memory such as a RAM and a ROM, a fixed disk device such as a hard disk, and storage means such as a flexible disk, an optical disk, and the like, which stores various processing, programs, tables, databases, files or the like.

The image read processing device 100 may be realized by connecting with an information processor such as a well-known personal computer and a work station to install software (including the program, the data and the like) for realizing the method of the invention in the information processor.

The specific form, integrated or dispersed, of the device is not limited to the form as illustrated, but all or some may be formed functionally or physically in a dispersed/integrated way, by the unit depending on the situation.

As set forth hereinabove, according to the invention, it is possible to provide the image read processing device, the image read processing method, the program, and the recording medium, improved in convenience, capable of automatically switching applications depending on the read document size and starting up the application, without a user's manual switching.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image read processing device, connected to a scanner reading an image of a document, at least comprising a memory and a controller, wherein
the memory comprises a setting information recording unit that is configured to record setting information defining a plurality of applications started by the controller depending on a document size of an image of a document read out by the scanner, and design information of the document including at least one of character, figure, symbol, color, and layout, and
the controller comprises:
a scanner controlling unit that controls the scanner;
a document size checking unit that checks the document size of the image read out by the scanner controlled by the scanner controlling unit;
a design recognizing unit that recognizes the design information from the image read out by the scanner; and
a start-up application determining unit that is configured to determine an application of the plurality of applications to start up depending on the document size checked by the document size checking unit and the design information recognized by the design recognizing unit, and configured to start up the application, based on the setting information recorded in the setting information recording unit.

2. The image read processing device according to claim 1, wherein
the start-up application determining unit is configured to transfer information of the image or the design information recognized by the design recognizing unit to the application started by the start-up application determining unit.

3. The image read processing device according to claim 1, wherein
the document size checking unit checks the document size of the image read out by the scanner by detecting an edge portion of the document in the image read out by the scanner.

4. The image read processing device according to claim 1, wherein
the start-up application determining unit is configured to start up a business card application or a mail application when the document size is business card size;
the start-up application determining unit is configured to start up a postcard application when the document size is postcard size;
the start-up application determining unit is configured to start up a receipt application when the document size is receipt size;
the start-up application determining unit is configured to start up a diary application when the document size is photo size;

the start-up application determining unit is configured to start up an application for a registered document size or an application for a registered layout when the document size is the registered document size in the memory, or when the layout of the image read out by the scanner is the registered layout in the memory; or the start-up application determining unit is configured to start up a file management application when the document size is not the document size registered in the memory or when the layout of the image read out by the scanner is not the layout registered in the memory.

5. The image read processing device according to claim 4, wherein the start-up application determining unit is configured to start up the mail application as the application, and transfer information of the image or the design information of the registered document as an attached file when at least one of,
1) at least one of images of a plurality of documents has the business card size,
2) a business card database includes the design information recognized by the design recognizing unit from the image of the business card size,
3) the design information recognized by the design recognizing unit from the image of the business card size includes a mail address, or
4) the character, the figure, the symbol, or the color recognized by the design recognizing unit from the image of the business card size is a previously specified character, figure, symbol, or color.

6. The image read processing device according to claim 4, wherein the diary application is configured to set the image of the document of the photo size in a photo display area and the other design information of the document as a main body of a diary, and configured to store the photo display area and main body of the diary when the diary application is started by the start-up application determining unit.

7. The image read processing device according to claim 4, wherein the start-up application determining unit is configured to start up a form application, and the form application is configured to store at least one of information of the image or the design information with the corresponding started form application when the document has the layout registered in the memory.

8. The image read processing device according to claim 1, wherein the start-up application determining unit is configured to store an application specified by a user based on at least one of the document size of the image checked by the document size checking unit or the design information recognized by the design recognizing unit in the setting information recording unit when the user opens the image read out by the scanner with the specified application.

9. An image read processing method performed by an image read processing device, connected to a scanner reading out an image of a document, at least comprising a memory and a controller, wherein the memory comprises a setting information recording unit that records setting information defining a plurality of applications started up by the controller depending on a document size of an image read out by the scanner, and design information of the document including at least one of character, figure, symbol, color, and layout, the method performed by the controller comprising:

a scanner controlling step of controlling the scanner to read out an image;

a document size checking step of checking the document size of the image read out by the scanner at the scanner controlling step;

a design recognizing step of recognizing the design information from the image read out by the scanner; and a start-up application determining step of determining an application of the plurality of applications depending on the document size checked at the document size checking step and the design information recognized by the design recognizing step, and starting up the application based on the setting information recorded in the setting information recording unit.

* * * * *